United States Patent

(12) United States Patent (10) Patent No.: US 9,368,980 B2
Miyanaga et al. (45) Date of Patent: Jun. 14, 2016

(54) BATTERY CONTROL CIRCUIT

(71) Applicant: ROHM CO., LTD., Kyoto (JP)

(72) Inventors: Koichi Miyanaga, Kyoto (JP); Jun Maede, Kyoto (JP)

(73) Assignee: ROHM CO., LTD. (JP)

( * ) Notice: Subject to any disclaimer, the term of this patent is extended or adjusted under 35 U.S.C. 154(b) by 337 days.

(21) Appl. No.: 13/932,622

(22) Filed: Jul. 1, 2013

(65) Prior Publication Data

US 2014/0159663 A1 Jun. 12, 2014

(30) Foreign Application Priority Data

Jul. 2, 2012 (JP) ................................. 2012-148766

(51) Int. Cl.
*H02J 7/00* (2006.01)
*H02J 7/34* (2006.01)

(52) U.S. Cl.
CPC ............... *H02J 7/0016* (2013.01); *H02J 7/345* (2013.01); *Y02T 10/7055* (2013.01)

(58) Field of Classification Search
CPC ........................... H02J 7/0014; B60L 11/1866

USPC .................. 320/107, 116, 119, 152, 166, 167
See application file for complete search history.

(56) References Cited

U.S. PATENT DOCUMENTS

| 2011/0204722 A1* | 8/2011 | Kim ...................... H02J 7/0016 307/77 |
| 2012/0194138 A1* | 8/2012 | Uno ...................... H01M 10/44 320/119 |
| 2014/0139184 A1* | 5/2014 | De Vries ............... H02J 7/0016 320/116 |

FOREIGN PATENT DOCUMENTS

JP 2002-246071 A 8/2002

* cited by examiner

*Primary Examiner* — Paul Dinh
(74) *Attorney, Agent, or Firm* — Cantor Colburn LLP

(57) ABSTRACT

A battery module includes an anode terminal, a cathode terminal, and multiple capacitor cells. Multiple tap electrodes are each provided to a corresponding connection node that connects adjacent capacitor cells. An intermediate terminal is connected to one from among the multiple tap electrodes. A battery control circuit includes a cell balance circuit configured to stabilize each of the voltages at the multiple tap electrodes to a corresponding target voltage level. The voltage at the anode terminal is supplied to the power supply terminal of the cell balance circuit.

5 Claims, 8 Drawing Sheets

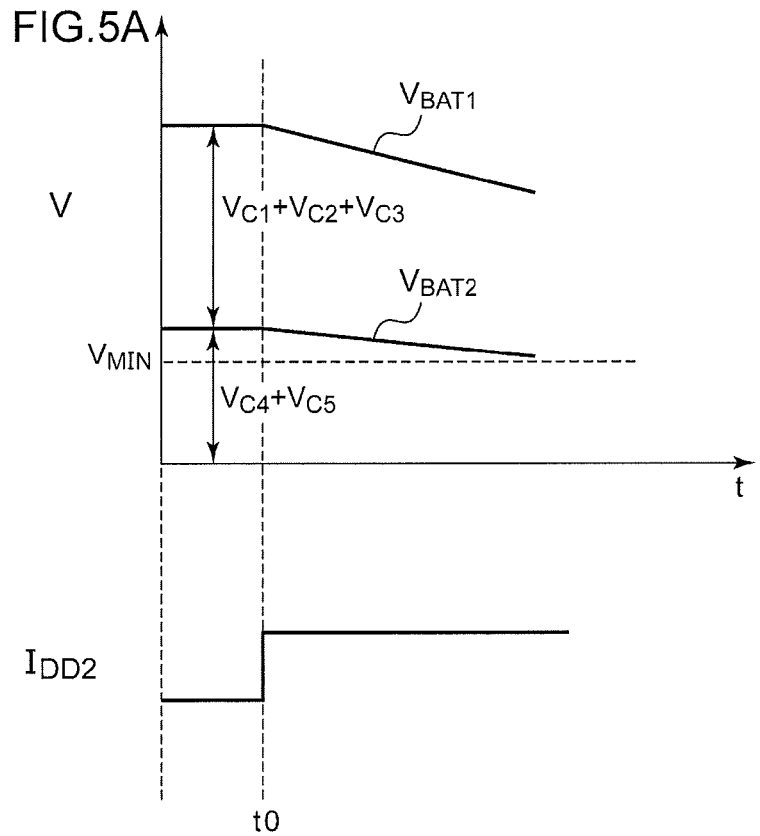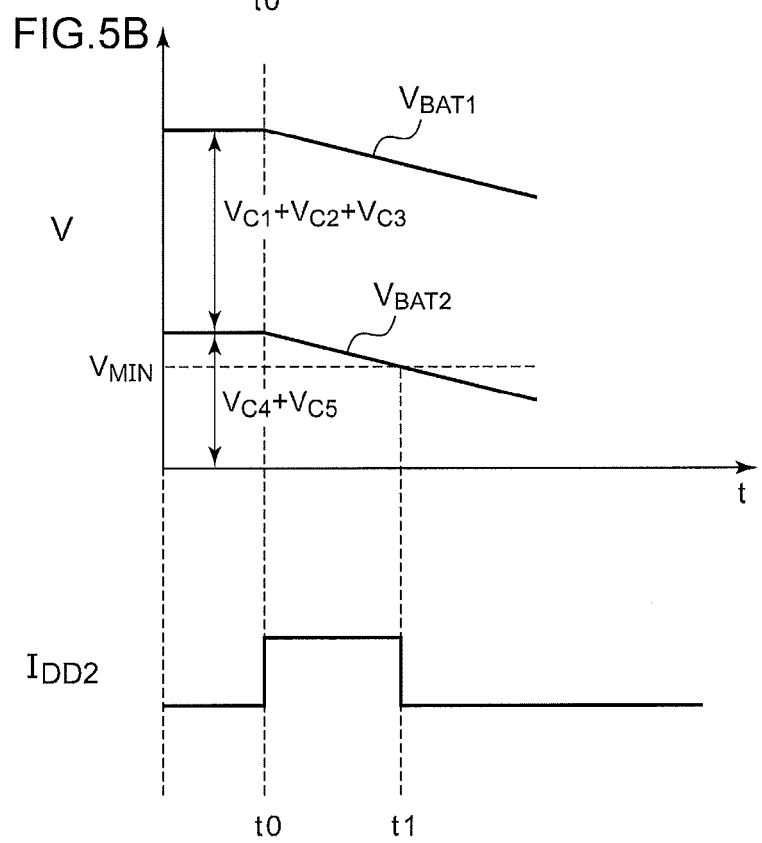

BATTERY CONTROL CIRCUIT

CROSS REFERENCE TO RELATED APPLICATIONS

The present invention claims priority under 35 U.S.C. §119 to Japanese Application No. 2012-148766 filed Jul. 2, 2012, the entire content of which is incorporated herein by reference.

BACKGROUND OF THE INVENTION

1. Field of the Invention

The present invention relates to a battery module comprising multiple battery cells.

2. Description of the Related Art

In recent years, a secondary battery is employed in electronic devices and industrial equipment, employed as a household rechargeable battery, and employed as a power source for hybrid vehicles, plug-in hybrid vehicles, electric vehicles, etc. Currently, a lithium ion battery has become broadly popular as such a secondary battery. Furthermore, development of such a lithium ion battery having a large battery capacity has been being advanced. However, such a lithium ion battery has a large internal impedance, leading to a problem in that it is difficult to draw a large current from such a lithium ion battery.

In view of such a situation, there are indications that an electric double-layer capacitor will become popular, as a replacement for such a lithium ion battery. An electric double-layer capacitor has a low input impedance, as compared with a lithium ion battery. Thus, such an electric double-layer capacitor has an advantage of allowing the user to easily draw an instantaneous large current. For example, a related technique has been disclosed in Japanese Patent Application Laid Open No. 2002-246071.

FIG. 1 is a circuit diagram showing a configuration of a power supply circuit $2r$ according to a first comparison technique investigated by the present inventors. With the first comparison technique, a battery module $10r$ includes multiple, i.e., N (N represents an integer of 2 or more) battery cells (capacitor cells) $CC_1$ through $CC_N$ stacked in series, a charger circuit 110, and a cell balance circuit 120. It should be noted that the power supply circuit $2r$ investigated by the present inventors shown in FIG. 1 is by no means regarded as a known technique.

The sum total of the terminal voltages (cell voltages) $V_{c1}$ through $V_{cN}$ of the multiple battery cells $CC_1$ through $CC_N$ is supplied as an output voltage (which will also be referred as the "battery voltage") $V_{BAT}$ that develops between an anode terminal 12 and a cathode terminal 14.

Upon receiving the supply of the input voltage $V_{IN}$ from an external circuit, the charger circuit 110 is configured to charge the capacitor cells $CC_1$ through $CC_N$. Because there are irregularities in the electrical characteristics of the capacitor cells $CC_1$ through $CC_N$, if such capacitor cells $CC_1$ through $CC_N$ are charged without any countermeasure for compensating for such irregularities, it leads to a problem in that there is a difference between the cell voltages $V_{c1}$ through $V_{cN}$. In order to solve such a problem, when the input voltage $v_{IN}$ is supplied, the cell balance circuit 120 is configured to operate so as to stabilize the voltages at the tap electrodes $TC_1$ through $TC_{N-1}$ to a predetermined level such that the multiple cell voltages $V_{c1}$ through $V_{cN}$ become the same voltage level.

It should be noted that the cell balance circuit 120 is arranged such that the input voltage $V_{IN}$ is supplied to a power supply terminal 122 of the cell balance circuit 120. Thus, in a state in which the input voltage $V_{IN}$ is not supplied, i.e., when the battery cells are not charged, the cell balance circuit 120 enters the non-operating state. Thus, wasted electric power consumption does not occur.

Typically, in a case of supplying a voltage to a load $4a$ configured to operate at a voltage level on the order of the battery voltage $V_{BAT}$, the battery voltage $V_{BAT}$ is supplied as-is to the load $4a$. However, in a case of supplying a voltage to a load $4b$ configured to operate at a voltage level that is significantly lower than the battery voltage $V_{BAT}$, there is a need to step down the battery voltage $V_{BAT}$ by means of a switching regulator (DC/DC converter) 6 before the operating voltage is supplied to the load $4b$.

SUMMARY OF THE INVENTION

The present invention has been made in view of such a situation. Accordingly, it is an exemplary purpose of an embodiment of the present invention to provide a battery module which is capable of stably supplying multiple voltages having different voltage levels to multiple loads.

An embodiment of the present invention relates to a battery control circuit mounted on a battery module. The battery module comprises: an anode terminal; a cathode terminal; a capacitor group comprising multiple capacitor cells connected in series between the anode terminal and the cathode terminal; multiple tap electrodes each provided to a corresponding connection node that connects the adjacent capacitor cells; and an intermediate terminal connected to one from among the multiple tap electrodes. The battery module is configured to be capable of outputting battery voltages having different voltage levels via the anode terminal and the intermediate terminal. The battery control circuit comprises a cell balance circuit configured to stabilize voltages at the multiple tap electrodes to respective target voltage levels. The cell balance circuit is arranged such that the voltage at the anode terminal is supplied to a power supply terminal of the cell balance circuit.

The current to be supplied to the load connected to the intermediate terminal is obtained as a discharging current that flows from the capacitor cells arranged on the lower voltage side than is the intermediate terminal. Thus, as the discharging of the low voltage side capacitor cells advances, the voltage (cell voltage) between both terminals of each of the low voltage side capacitor cells becomes lower than the cell voltage of each of the capacitor cells arranged on the high voltage side. With such a battery control circuit, the cell balance circuit is configured to operate using the voltage supplied via the anode terminal even when the input voltage is not supplied to the charger circuit configured to charge the capacitor group. Thus, such an arrangement is capable of stably supplying electric power to multiple loads while stabilizing the voltage that develops at each of the tap electrodes to a corresponding target voltage level, i.e., while maintaining a balance between the multiple cell voltages.

Another embodiment of the present invention also relates to a battery control circuit mounted on a battery module. The battery control circuit comprises: a cell balance circuit configured to stabilize voltages at the multiple tap electrodes to their respective target voltage levels; and a selector having its output terminal connected to a power supply terminal of the cell balance circuit, its first input terminal supplied with an input voltage of a charger circuit configured to charge the battery module, and its second input terminal supplied with the voltage at the anode terminal.

The current to be supplied to the load connected to the intermediate terminal is obtained as a discharging current that flows from the capacitor cells arranged on the lower voltage side than is the intermediate terminal. Thus, as the discharging of the low voltage side capacitor cells advances, the cell voltage of each of the low voltage side capacitor cells becomes lower than the cell voltage of each of the capacitor cells arranged on the high voltage side. When the input voltage for the charger circuit configured to charge the capacitor cell group is not supplied, the battery control circuit is configured to instruct the selector to select the voltage that develops at the anode terminal. When the input voltage is supplied, the battery control circuit is configured to instruct the selector to select the input voltage. Thus, such an arrangement is capable of stably supplying electric power to multiple loads while stabilizing the voltage at each of the tap electrodes to a corresponding target voltage level, i.e., while maintaining a balance between the multiple cell voltages.

Yet another embodiment of the present invention also relates to a battery control circuit mounted on a battery module. The battery module comprises: an anode terminal; a cathode terminal; a secondary cell group comprising multiple secondary cells connected in series between the anode terminal and the cathode terminal; and at least one intermediate terminal each connected to corresponding one from among the multiple secondary cells. The battery module is configured to output battery voltages having different voltage levels via the anode terminal and the at least one intermediate terminal. The battery control circuit comprises: a reference voltage circuit configured to divide a voltage between the anode terminal and the cathode terminal, so as to generate at least one reference voltage which determines target voltage level of the at least one intermediate terminal; and at least one regulator respectively provided to the at least one intermediate terminal, and each has its input terminal supplied with corresponding one from among the at least one reference voltage, and its output terminal connected to corresponding one from among the at least one intermediate terminal. The voltage at the anode terminal is supplied to a power supply terminal of each of the at least one regulator.

The current to be supplied to the load connected to the intermediate terminal is obtained as a discharging current that flows from the secondary cells arranged on the lower voltage side than is the intermediate terminal. Thus, as the discharging of the low voltage side secondary cells advances, the cell voltage of each of the low voltage side secondary cells becomes lower than the cell voltage of each of the secondary cells arranged on the high voltage side. With such a battery control circuit, the multiple regulators are each configured to operate using the voltage supplied via the anode terminal even when the input voltage is not supplied to the charger circuit configured to charge the capacitor group. Thus, such an arrangement is capable of stably supplying electric power to multiple loads while stabilizing the voltage that develops at each of the at least one intermediate terminal to a corresponding target voltage level.

Yet another embodiment of the present invention also relates to a battery control circuit. The battery control circuit comprises: a reference voltage circuit configured to divide a voltage between the anode terminal and the cathode terminal, so as to generate at least one reference voltage which determines the target voltage level of the at least one intermediate terminal; at least one regulator respectively provided to the at least one intermediate terminal, and each has its input terminal supplied with corresponding one from among the at least one reference voltage, and its output terminal connected to corresponding one from among the at least one intermediate terminal; and a selector having its output terminal connected to a power supply terminal of each of the at least one regulator, its first input terminal supplied with an input voltage of a charger circuit configured to charge the battery module, and its second input terminal supplied with the voltage that develops at the anode terminal.

The current to be supplied to the load connected to the intermediate terminal is obtained as a discharging current that flows from the secondary cells arranged on the lower voltage side than is the intermediate terminal. Thus, as the discharging of the low voltage side secondary cells advances, the cell voltage of each of the low voltage side secondary cells becomes lower than the cell voltage of each of the secondary cells arranged on the high voltage side. When the input voltage for the charger circuit configured to charge the secondary cell group is not supplied, the battery control circuit is configured to instruct the selector to select the voltage that develops at the anode terminal. When the input voltage is supplied, the battery control circuit is configured to instruct the selector to select the input voltage. Thus, such an arrangement is capable of stably supplying electric power to multiple loads while stabilizing the voltage at each of at least one intermediate terminal to a corresponding target voltage level.

Yet another embodiment of the present invention relates to a battery module. The battery module comprises: an anode terminal; a cathode terminal; a capacitor cell group (or otherwise a secondary cell group) comprising multiple capacitor cells (or otherwise multiple secondary cells) connected in series and arranged between the anode terminal and the cathode terminal; and the aforementioned battery control circuit.

Also, the battery module may further comprise a charger circuit configured to receive the input voltage from an external circuit, and to charge the capacitor group.

Yet another embodiment of the present invention relates to a power supply circuit. The power supply circuit comprises: the aforementioned battery module; and a charger circuit configured to charge the battery module.

Yet another embodiment of the present invention relates to an electronic device. The electronic device may comprise the aforementioned battery module.

Yet another embodiment of the present invention relates to a vehicle. The vehicle may comprise the aforementioned battery module.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5A is an operation waveform diagram showing the operation of the battery module shown in FIG. 2 when it is not being charged, and FIG. 5B is an operation waveform diagram showing the operation of the battery module shown in FIG. 4 when it is not being charged.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, a state represented by the phrase "the member A is connected to the member B" includes a state in which the member A is indirectly connected to the member B via another member that does not affect the electric connection therebetween, in addition to a state in which the member A is physically and directly connected to the member B.

Similarly, a state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

[First Embodiment]

Figure 2:
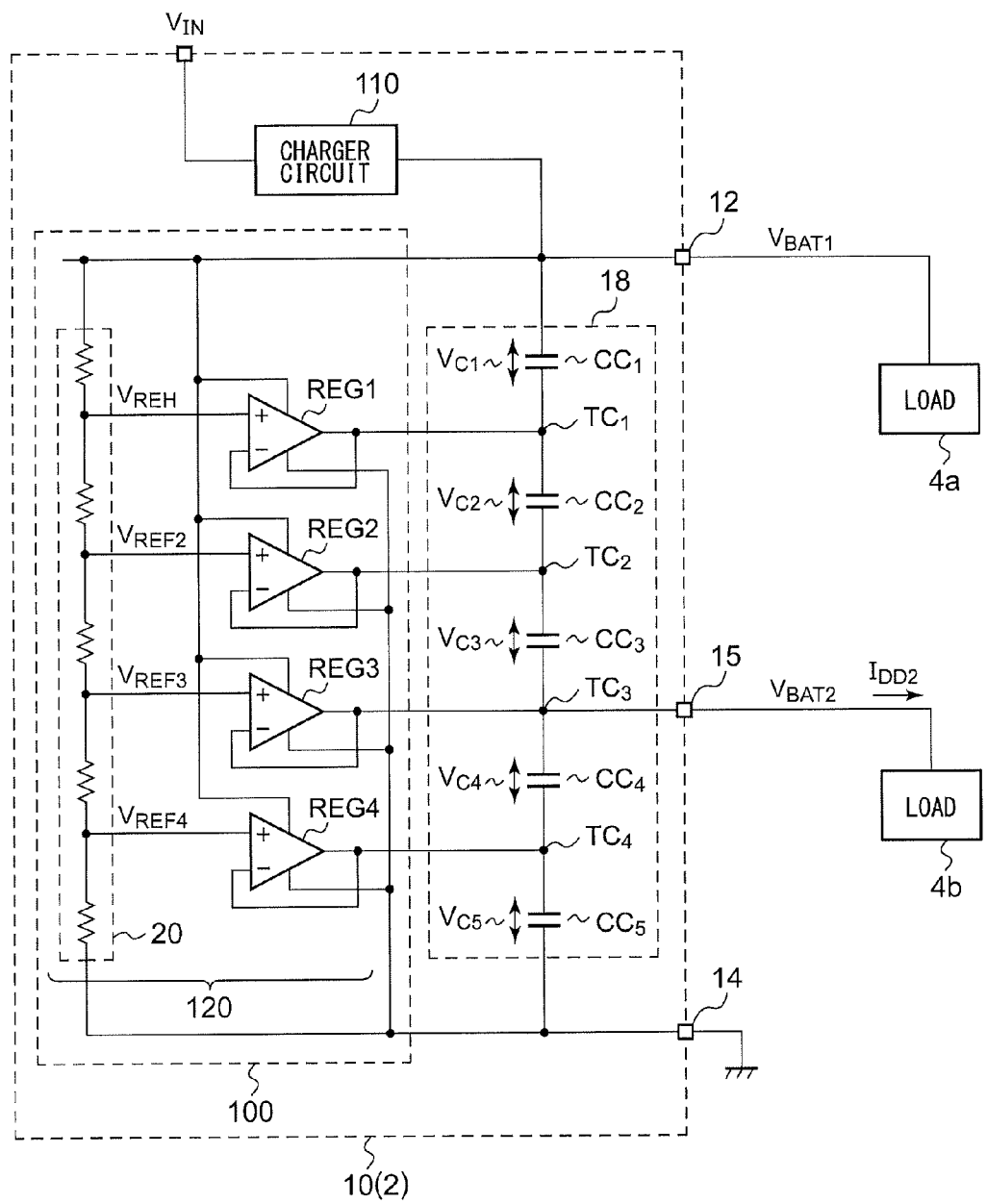
FIG. 2 is a circuit showing an example configuration of a battery module according to a first embodiment.

FIG. 2 is a circuit diagram showing a configuration of a battery module (which will also be referred to as the "battery pack") 10 according to a first embodiment. The battery module 10 is configured as a power supply circuit 2 configured to supply electric power to loads 4a and 4b. The battery module 10 includes an anode terminal 12, a cathode terminal 14, an intermediate terminal 15, multiple tap electrodes TC, a capacitor group 18, a battery control circuit 100, and a charger circuit 110.

The capacitor group 18 is arranged between the anode terminal 12 and the cathode terminal 14, and includes multiple, i.e., N (N represents an integer of 2 or more), capacitor cells $CC_1$ through $CC_N$. The capacitor cells CC are each configured as an electric double-layer capacitor or otherwise a lithium ion capacitor. FIG. 2 shows an arrangement in which N=5. However, the number N of capacitor cells CC is not restricted in particular.

The multiple tap electrodes $TC_1$ through $TC_{N-1}$ are each arranged as a connection node that connects the adjacent capacitor cells CC. Specifically, the i-th (1≤i≤N−1) tap capacitor $TC_i$ is arranged as a connection node that connects the capacitor cells $CC_i$ and $CC_{i+1}$.

The intermediate terminal 15 is connected to one from among the multiple tap electrodes $TC_1$ through $TC_N$. Description will be made in the present embodiment regarding an arrangement including a single intermediate terminal 15. However, the number of intermediate terminals 15 is not restricted in particular.

The battery module 10 is configured to output battery voltages $V_{BAT1}$ and $V_{BAT2}$ having different voltage levels via the anode terminal 12 and the intermediate terminal 15.

The charger circuit 110 is configured to receive the input voltage $V_{IN}$ from an external circuit, and to charge the capacitor group 18. It should be noted that the input voltage $V_{IN}$ is not necessarily supplied to the battery module 10 at all times. The configuration of the charger circuit 110 is not restricted in particular. Rather, various kinds of known charger circuits may be employed as the charger circuit 110. The charger circuit 110 may be configured to switch the charging mode between the constant current (CC) charging mode and the constant voltage (CV) charging mode according to the battery voltage $V_{BAT1}$, i.e., according to the remaining battery charge of the capacitor group 18.

The charger circuit 110 may be arranged as an external component of the battery module 10. In this case, a set of the battery module 10 and the charger circuit 110 corresponds to the power supply circuit 2.

The battery control circuit 100 includes a cell balance circuit 120 monolithically integrated on a single semiconductor substrate. Examples of such a "monolithically integrated" arrangement include: an arrangement in which all the circuit components are formed on a semiconductor substrate; and an arrangement in which principal circuit components are monolithically integrated. Also, a part of circuit components such as resistors and capacitors may be arranged in the form of components external to such a semiconductor substrate in order to allow the circuit constants to be adjust.

The cell balance circuit 120 is configured to stabilize the voltages at the multiple tap electrodes $TC_1$ through $TC_{N-1}$ to the respective target voltage levels $V_{REF1}$ through $V_{REFN-1}$. With the present embodiment, the battery voltage $V_{BAT1}$ at the anode terminal 12 is supplied to the power supply terminal 122 of the cell balance circuit 120.

Description will be made regarding an example configuration of the cell balance circuit 120. The cell balance circuit 120 includes a reference voltage circuit 20 and multiple regulators $REG_1$ through $REG_{N-1}$. The reference voltage circuit 20 is configured to divide the voltage between the anode terminal 12 and the cathode terminal 14, so as to generate the multiple reference voltages $V_{REF1}$ through $V_{REFN-1}$ that determine the respective target voltage levels at the multiple tap electrodes $TC_1$ through $TC_{N-1}$. For example, the reference voltage circuit 20 may be configured as a resistor dividing circuit including N resistors arranged between the anode terminal 12 and the cathode terminal 14. The N resistors may each be configured to have the same resistance value.

The multiple regulators $REG_1$ through $REG_{N-1}$ are provided to the tap terminals $TC_1$ through $TC_{N-1}$, respectively. The i-th regulator REGi is arranged such that the corresponding reference voltage $V_{REFi}$ from among the multiple reference voltages $V_{REF1}$ through $V_{REFN-1}$ is input to its input terminal, and its output terminal is connected to the corresponding tap electrode $TC_i$ from among the multiple tap electrodes $TC_1$ through $TC_{N-1}$.

The multiple regulators $REG_1$ through $REG_{N-1}$ are each arranged such that the voltage $V_{BAT1}$ at the anode terminal 12 is supplied to their respective high voltage side power supply terminals. Thus, the regulators $REG_1$ through $REG_4$ are each configured to be capable of operating regardless of the presence or absence of the input voltage $V_{IN}$. It should be noted that the configuration of the cell balance circuit 120 is not restricted to such an arrangement shown in FIG. 2.

Figure 3:
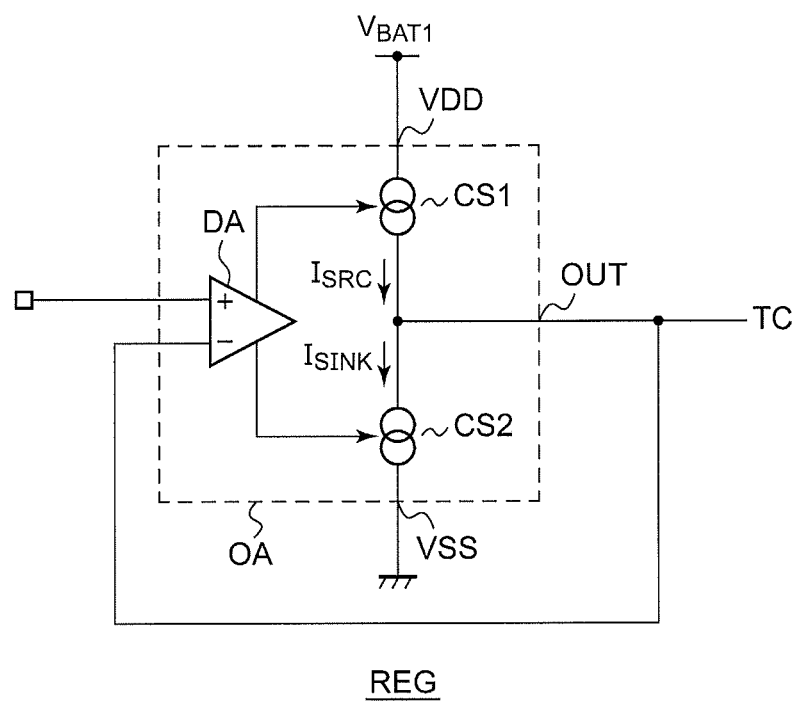
FIG. 3 is a circuit diagram showing an example configuration of a regulator.

FIG. 3 is a circuit diagram showing an example configuration of the regulator REG. The regulator REG is configured as a voltage follower (buffer amplifier) including an operational amplifier OA. The operational amplifier OA is arranged such that its inverting input terminal (−) is connected to its output terminal OUT, and the corresponding reference voltage $V_{REF}$ is input to its non-inverting input terminal (+).

The operational amplifier OA includes: a high voltage side power supply terminal VDD; a low voltage side power supply terminal VSS; an inverting input terminal (−); a non-inverting input terminal (+); an output terminal OUT; a high voltage side current source CS1 arranged between the high voltage side power supply terminal VDD and the output terminal OUT, and configured to generate a source current $I_{SRC}$; a low voltage side current source CS2 arranged between the low voltage side power supply terminal VSS and the output terminal OUT, and configured to generate a sink current $I_{SINK}$; and an differential amplifier DA. The differential amplifier DA is configured to control the high voltage side current source CS1 and the low voltage side current source CS2 such that the difference between the voltage at its inverting input terminal and the voltage at its non-inverting input terminal becomes zero, thereby controlling the source current $I_{SRC}$ and the sink current $I_{SINK}$. The configurations of the operational amplifier and the regulator REG are not restricted to such a configuration shown in FIG. 2. Also, various kinds of known circuit configurations may be employed.

The above is the configuration of the battery control circuit 100 and the configuration of the battery module 10 employing the battery control circuit 100.

First, description will be made regarding the operation of the battery module 10 when it is being charged.

When the input voltage $V_{IN}$ is supplied to the battery module 10, the charger circuit 110 is configured to supply the charging current to the capacitor group 18 so as to charge the capacitor group 18. The cell balance circuit 120 is configured to stabilize the voltage levels at the multiple tap electrodes $TC_1$ through $TC_{N-1}$ to the reference voltages $V_{REF1}$ through $V_{REFN-1}$. Thus, the cell voltages $V_{c1}$ through $V_{c5}$ of the capacitor cells $CC_1$ through $CC_5$ are maintained at the same level.

Next, description will be made regarding the operation of the battery module 10 when it is not being charged.

By making a comparison between the present embodiment and the second related technique, the advantage of the battery module 10 can be clearly understood. Thus, next, description will be made below regarding the second comparison technique.

Figure 4:
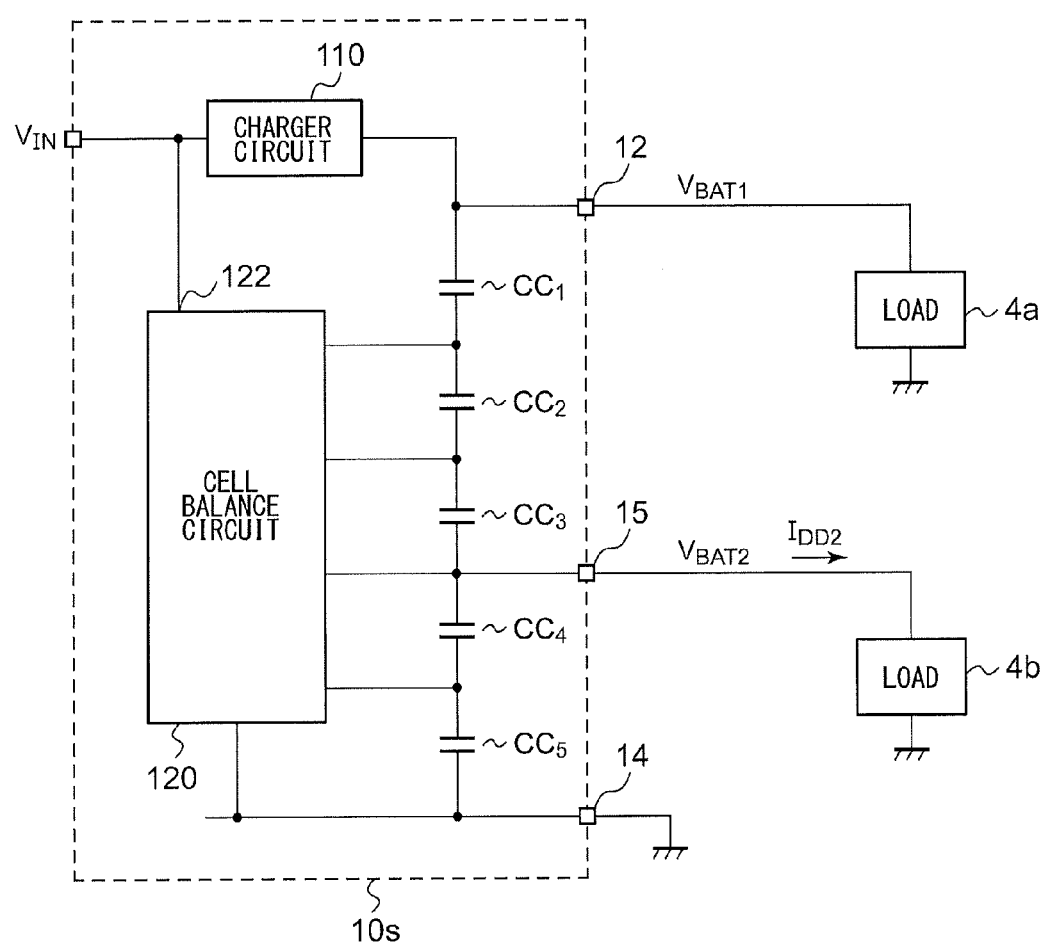
FIG. 4 is a circuit diagram showing a configuration of a battery module according to a second comparison technique.

FIG. 4 is a circuit diagram showing a configuration of a battery module 10s according to the second comparison technique. The battery module 10s has the same configuration as that of the battery module 10r shown in FIG. 1, except that it does not include the switching regulator 6, and includes an intermediate terminal 15.

FIG. 5B is a waveform diagram showing the operation of the battery module 10s shown in FIG. 4 when it is not being charged.

Let us consider a case in which, before the time point t0, the cell voltages $V_{c1}$ through $V_{c5}$ of the capacitor cells $CC_1$ through $CC_5$ are all equivalently balanced. At the time point t0, the load 4b starts to operate, and the load current $I_{DD2}$ starts to flow. For ease of understanding, let us consider a case in which there is no current that flows through the load 4a. When the load current $I_{DD2}$ flows, this discharges the charges stored in the capacitor cells $CC_4$ and $CC_5$ which are closer to the cathode terminal 14 side than is the tap electrode $TC_3$ connected to the intermediate terminal 15.

When the battery module 10s is not being charged, the input voltage $V_{IN}$, i.e., the power supply voltage for the cell balance circuit 120, is not supplied. Thus, in this state, the cell balance circuit 120 enters the non-operating state. Thus, as the capacitor cells $CC_4$ and $CC_5$ are discharged, the respective cell voltages $V_{c4}$ and $V_{c5}$ of the capacitor cells $CC_4$ and $CC_5$ fall, which results in the voltage $V_{BAT2}$ at the intermediate terminal 15 falling over the time. On the other hand, the capacitor cells $CC_1$ through $CC_3$ are not discharged. Thus, the battery voltage $V_{BAT1}$ falls while the cell voltages $V_{c1}$ through $V_{c3}$ are each maintained at the initial voltage level.

When the voltage $V_{BAT2}$ at the intermediate terminal 15 becomes lower than the minimum guaranteed operating voltage (rated voltage) $V_{MIN}$ for the load 4b, the load 4b cannot operate normally. In this case, with the battery module 10s shown in FIG. 4, the load current $I_{DD2}$ is supplied to the load 4b. This intensively discharges only the part of the capacitor cells that are arranged on the cathode terminal 14 side. This leads to a problem in that the load 4b can operate for only a short period of time, as represented by the period of time from the time point t0 up to the time point t1.

Next, description will be made regarding the operation of the battery module 10 shown in FIG. 2.

FIG. 5A is an operation waveform diagram showing the operation of the battery module 10 shown in FIG. 2 when it is not being charged.

When the battery module 10 is not being charged, the input voltage $V_{IN}$ is not supplied. In this state, the charger circuit 110 enters the non-operating state. After the load current $I_{DD2}$ starts to flow at the time point t0, this discharges the charges stored in the capacitor cells $CC_4$ and $CC_5$, which are arranged closer to the cathode terminal 14 side than is the tap electrode $TC_3$ connected to the intermediate terminal 15. Thus, the voltage $V_{BAT2}$ at the intermediate terminal 15 falls over the time.

With the battery module 10s shown in FIG. 4, the cell balance circuit 120 does not operate when the battery module 10s is not being charged. In contrast, with the battery module 10 shown in FIG. 2, the cell balance circuit 120 operates even when the battery module 10 is not being charged. Thus, the cell balance circuit 120 is configured to operate so as to maintain each of the multiple cell voltages $V_{c1}$ through $V_{c5}$ at a constant level. Specifically, in this case, in order to maintain the voltage levels of the tap electrodes $TC_3$ and $TC_4$ at the reference voltages $V_{REF3}$ and $V_{REF4}$, the regulators $REG_3$ and $REG_4$ are configured to supply a charging current (source current) to the capacitor cells $CC_4$ and $CC_5$. The charging current is supplied from the capacitor cell $CC_1$ on the anode terminal 12 side via the high voltage side current source CS1 of the corresponding regulator REG shown in FIG. 3.

Thus, the cell voltages $V_{c4}$ and $V_{c5}$ of the capacitor cells $CC_4$ and $CC_5$ each fall at a low rate, as compared with an arrangement shown in FIG. 5B in which the cell balance circuit 120 is not operated when the battery module is not being charged. Thus, such an arrangement provides an advantage in that the voltage $V_{BAT2}$ at the intermediate terminal 15 falls at a low rate.

After the time point t1 when the voltage $V_{BAT2}$ at the intermediate terminal 15 becomes lower than the minimum guaranteed operating voltage (rated voltage) $V_{MIN}$ for the load 4b, the load 4b cannot operate normally. The period of time from t0 up to t1 in which the load 4b can operate is longer than that shown in FIG. 5B.

As described above, the battery module 10 shown in FIG. 2 has an advantage of being capable of driving the load 4b for a long period of time as compared with the battery module 10s shown in FIG. 4.

Figure 1:
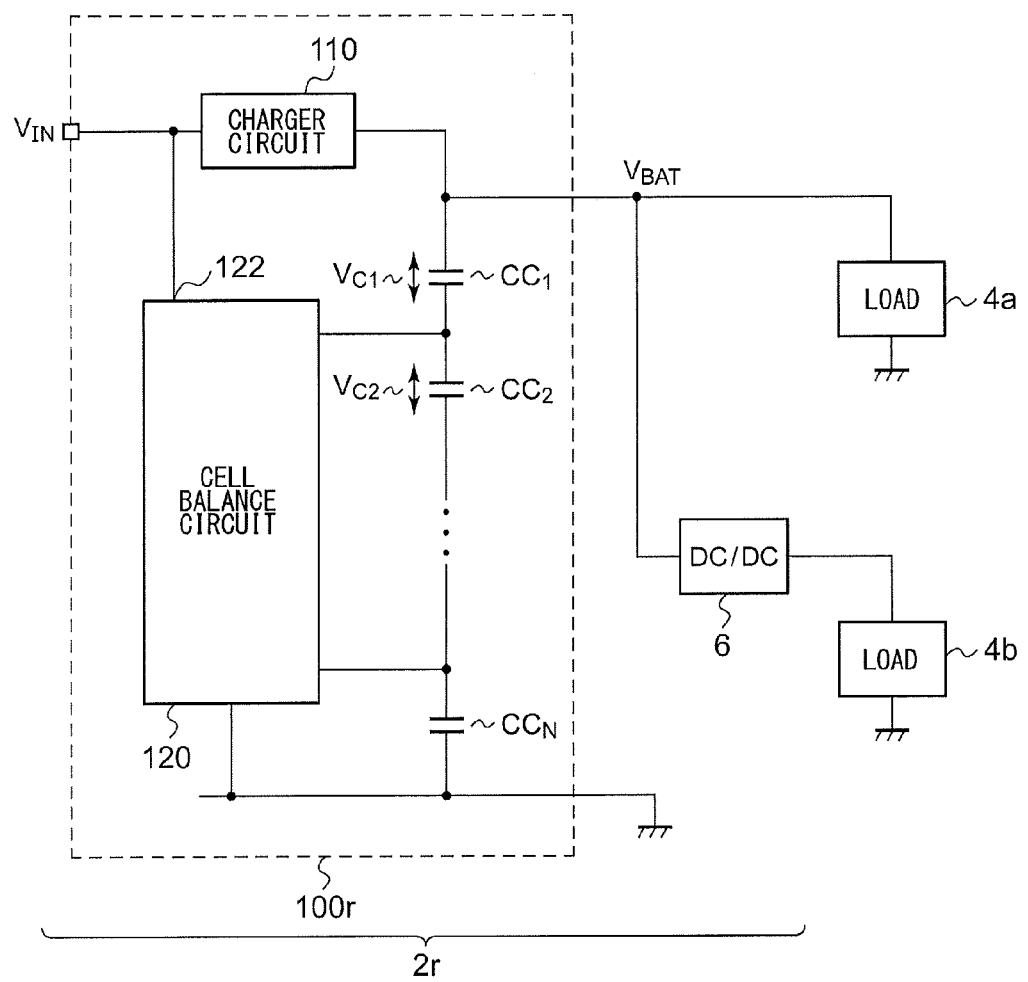
FIG. 1 is a circuit diagram showing a configuration of a power supply circuit according to a first comparison technique investigated by the present inventors.

Furthermore, the battery module 10 shown in FIG. 2 does not require the switching regulator 6, thereby providing an advantage of having a simple circuit configuration as compared with the battery module 10r shown in FIG. 1.

[Second Embodiment]

Figure 6:
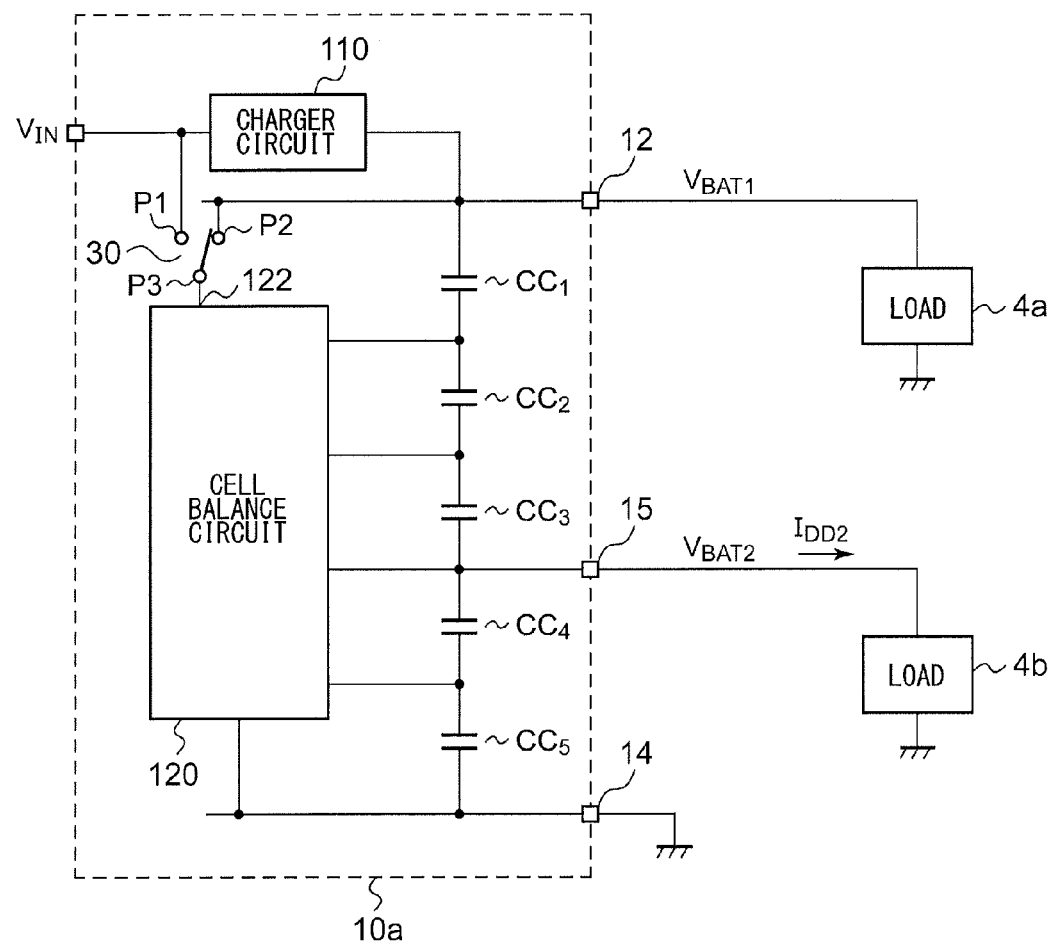
FIG. 6 is a circuit diagram showing a configuration of a battery module according to a second embodiment.

FIG. 6 is a circuit diagram showing a configuration of a battery module 10a according to a second embodiment. The battery module 10a has the same configuration as that of the battery module 10 shown in FIG. 2, except that the battery module 10a further includes a selector 30. The selector 30 is arranged such that its output terminal P3 is connected to the power supply terminal 122 of the cell balance circuit 120; the input voltage $V_{IN}$, which is to be input to the charger circuit 110 configured to charge the cell module 10a, is input to the first input terminal P1; and the $V_{BAT1}$, which is output via the anode terminal 12, is input to the second input terminal P2.

The above is the configuration of the battery module 10a. With the battery module 10a, when the input voltage $V_{IN}$ is not supplied from an external circuit, the selector 30 is instructed to select the battery voltage $V_{BAT1}$ of the anode terminal 12. When the input voltage $V_{IN}$ is supplied from an external circuit in the charging mode, the selector 30 is instructed to select the input voltage $V_{IN}$. Thus, such an arrangement provides the same advantages as those provided by the first embodiment.

[Third Embodiment]

Description has been made in the embodiments 1 and 2 regarding a battery module including capacitor cells. Description will be made in the third embodiment regarding a battery module including secondary battery cells.

Figure 7:
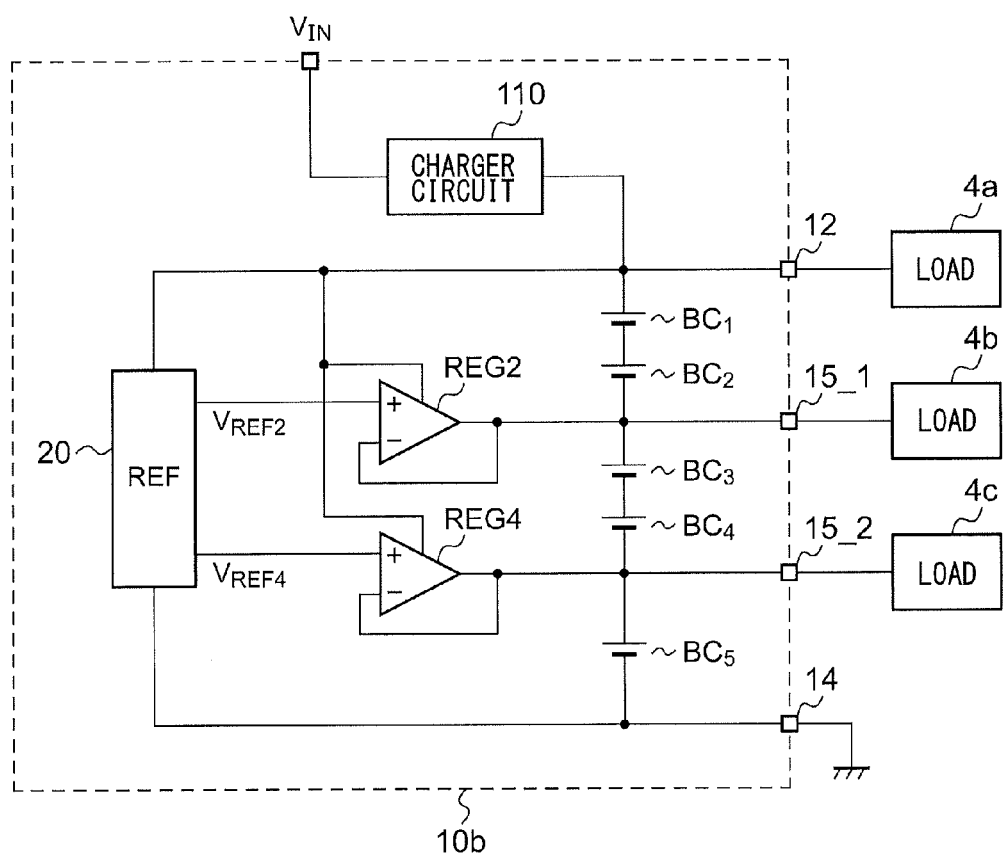
FIG. 7 is a circuit diagram showing a configuration of a battery module according to a third embodiment.

FIG. 7 is a circuit diagram showing a configuration of a battery module 10b according to a third embodiment.

The battery module 10b includes multiple secondary battery cells BC, instead of the capacitor cells CC shown in FIG. 2. Each secondary cell BC may be configured as a lithium ion battery cell. Also, various kinds of other cells may be employed as such a secondary cell BC.

Furthermore, the battery module 10b includes at least one intermediate terminal. Description will be made regarding an arrangement including two intermediate terminals 15_1 and 15_2, instead of the intermediate terminal 15 shown in FIG. 2. Moreover, the battery module 10b includes regulators $REG_2$ and $REG_4$ provided to the intermediate terminals 15_1 and 15_2, instead of the cell balance circuit 120 shown in FIG. 2.

The intermediate terminals 15_1 and 15_2 are respectively connected to corresponding secondary battery cells $BC_2$ and $BC_4$ from among the multiple secondary battery cells. The reference voltage circuit 20 is configured to generate the reference voltages $V_{REF2}$ and $V_{REF4}$. The reference voltage circuit 20 may have the same configuration as that of the reference voltage circuit 20 shown in FIG. 2.

The battery module 10b shown in FIG. 7 provides the same advantages as those provided by the first embodiment.

[Fourth Embodiment]

A battery module according to a fourth embodiment has the same configuration as that of the battery module 10b shown in FIG. 7 except that it further includes a selector shown in FIG. 6. Such a battery module also provides the same advantages as those provided by the first embodiment.

Figure 8A:
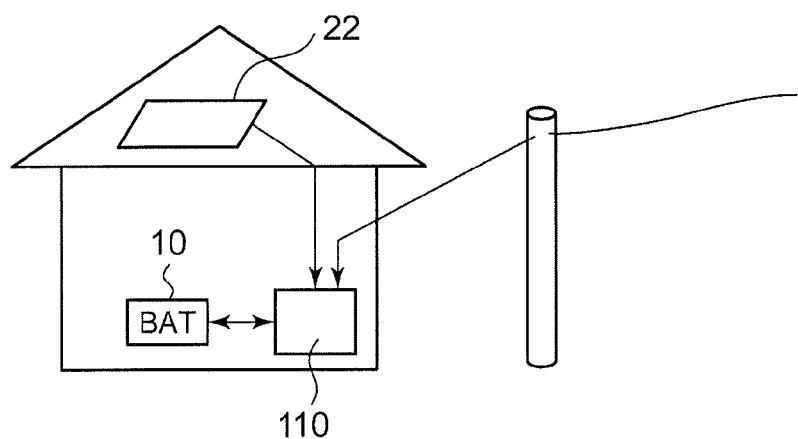
FIGS. 8A and 8B are diagrams each showing the usage of the battery module.
Figure 8B:
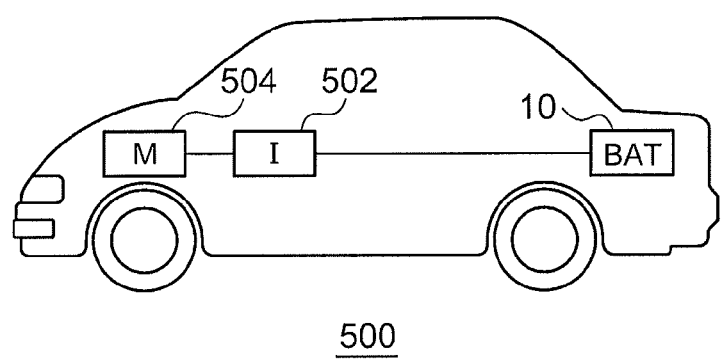

Lastly, description will be made regarding the usage of the battery module 10 according to the first or second embodiment. FIGS. 8A and 8B are diagrams each showing usages of the battery module 10. In FIG. 8A, the battery module 10 is employed as a household rechargeable battery. A charging/discharging apparatus 110 corresponds to the charging circuit 110 shown in FIG. 2. The charging/discharging apparatus 110 is connected to a solar cell module 22 or otherwise a commercial AC power supply, and is configured to charge the battery module 10. Furthermore, the charging/discharging apparatus 110 is configured to convert the DC voltage received from the battery module 10 into an AC voltage, and to supply the AC voltage thus converted to an unshown consumer electronics device, lighting device, air-conditioning equipment, or the like. Such a consumer electronics device, lighting device, air-conditioning equipment, each correspond to any one of the loads 4a through 4c.

In FIG. 8B, the cell module 10 is mounted on a vehicle 500 such as a hybrid vehicle, electric vehicle, or the like. The vehicle 500 includes an inverter 502 and an electric motor 504, in addition to the battery module 10. The inverter 502 corresponds to the load 4a, for example. The inverter 502 is configured to convert the DC voltage received from the battery module 10 into an AC voltage, so as to drive the motor 504. The rotation of the shaft of the motor 504 is transmitted to a drive wheel via gears, thereby driving the vehicle 500. The load 4b corresponds to an unshown electric device system such as an ECU, lighting device, etc. The voltage $V_{BAT2}$ is supplied from the battery module 10 to such an electric device system.

While the preferred embodiments of the present invention have been described using specific terms, such description is for illustrative purposes only, and it is to be understood that changes and variations may be made without departing from the spirit or scope of the appended claims.

What is claimed is:

1. A battery control circuit mounted on a battery module, wherein the battery module comprises:
    an anode terminal;
    a cathode terminal;
    a capacitor group comprising a plurality of capacitor cells connected in series between the anode terminal and the cathode terminal;
    a plurality of tap electrodes each provided to a corresponding connection node that connects the adjacent capacitor cells; and
    an intermediate terminal connected to one from among the plurality of tap electrodes, and
    wherein the battery module is structured to output battery voltages having different voltage levels via the anode terminal and the intermediate terminal, and
    wherein the battery control circuit comprises:
        a cell balance circuit configured to stabilize voltages at the plurality of tap electrodes to their respective target voltage levels; and
        a selector having its output terminal connected to a power supply terminal of the cell balance circuit, its first input terminal supplied with an input voltage of a charger circuit configured to charge the battery module, and its second input terminal supplied with the voltage at the anode terminal, wherein the cell balance circuit comprises:
        a reference voltage circuit configured to divide a voltage between the anode terminal and the cathode terminal, so as to generate a plurality of reference voltages which determine the respective target voltage levels for the plurality of tap electrodes; and
        a plurality of regulators respectively provided to the tap electrodes, and each having its input terminal supplied with corresponding one from among the plurality of reference voltages, and its output terminal connected to corresponding one from among the plurality of tap electrodes, and
        wherein the selector has its output terminal connected to the high voltage side power supply terminal of each of the plurality of regulators.

2. The battery control circuit according to claim 1, wherein the regulators are each configured as a voltage follower comprising an operational amplifier arranged such that its inverting input terminal is connected to its output terminal.

3. The battery control circuit according to claim 1, wherein the regulators each comprise an operational amplifier,
    and wherein the operational amplifier comprises:
        a high voltage side power supply terminal;

a low voltage side power supply terminal;
an inverting input terminal;
a non-inverting input terminal;
an output terminal;
a high voltage side current source arranged between the high voltage side power supply terminal and the output terminal, and configured to generate a source current;
a low voltage side current source arranged between the low voltage side power supply terminal and the output terminal, and configured to generate a sink current; and
a differential amplifier configured to control the high voltage side current source and the low voltage side current source so as to control the source current and the sink current.

4. A battery module comprising:
an anode terminal;
a cathode terminal;
a capacitor group comprising a plurality of capacitor cells connected in series and arranged between the anode terminal and the cathode terminal; and
the battery control circuit according to claim 1.

5. A power supply circuit comprising:
the battery module according to claim 4; and
a charger circuit configured to charge the battery module.

* * * * *